(12) United States Patent  (10) Patent No.: US 7,698,040 B2
Long  (45) Date of Patent: Apr. 13, 2010

(54) VEHICLE FLASHER SYSTEM FOR INDICATING EMERGENCY BRAKING

(76) Inventor: Ronald Long, 472 Sierra Leaf Cir., Reno, NV (US) 89511

( * ) Notice: Subject to any disclaimer, the term of this patent is extended or adjusted under 35 U.S.C. 154(b) by 773 days.

(21) Appl. No.: 11/457,588

(22) Filed: Jul. 14, 2006

(65) Prior Publication Data
US 2007/0016348 A1 Jan. 18, 2007

Related U.S. Application Data

(60) Provisional application No. 60/595,554, filed on Jul. 14, 2005.

(51) Int. Cl.
G06F 7/00 (2006.01)
(52) U.S. Cl. .................. 701/49; 701/1; 701/36; 180/170; 180/271; 180/282; 340/463; 340/901
(58) Field of Classification Search ............... 71/49, 71/1, 36
See application file for complete search history.

(56) References Cited

U.S. PATENT DOCUMENTS

| | | | |
|---|---|---|---|
| 6,023,221 A * | 2/2000 | Michelotti | 340/471 |
| 6,278,360 B1 * | 8/2001 | Yanagi | 340/436 |
| 6,278,364 B1 * | 8/2001 | Robert | 340/467 |
| 6,417,767 B1 * | 7/2002 | Carlson et al. | 340/467 |
| 6,424,256 B1 * | 7/2002 | Ryder | 340/479 |
| 6,611,739 B1 * | 8/2003 | Harvey et al. | 701/29 |
| 6,831,572 B2 * | 12/2004 | Strumolo et al. | 340/903 |
| 6,879,247 B2 * | 4/2005 | Shimomura et al. | 340/426.18 |
| 6,889,792 B1 * | 5/2005 | Fardoun et al. | 180/287 |
| 6,947,816 B2 * | 9/2005 | Chen | 701/33 |
| 7,520,573 B2 * | 4/2009 | Carpenter et al. | 303/122.08 |
| 2003/0122663 A1* | 7/2003 | Carlson et al. | 340/467 |
| 2003/0201886 A1* | 10/2003 | Robbins et al. | 340/471 |
| 2005/0099286 A1* | 5/2005 | DeYoung | 340/463 |
| 2005/0119809 A1* | 6/2005 | Chen | 701/33 |
| 2005/0134284 A1* | 6/2005 | Hoff et al. | 324/511 |
| 2005/0162265 A1* | 7/2005 | Werner et al. | 340/468 |

* cited by examiner

Primary Examiner—Khoi Tran
Assistant Examiner—Jonathan Sample
(74) Attorney, Agent, or Firm—Timothy Brisson

(57) ABSTRACT

One embodiment of this invention discloses a system for activating a vehicle's emergency flashers upon harsh braking or if the vehicle otherwise undergoes severe deceleration.

13 Claims, 2 Drawing Sheets

VEHICLE FLASHER SYSTEM FOR INDICATING EMERGENCY BRAKING

RELATED APPLICATIONS

This application claims the benefit of U.S. Provisional Application No. 60/595,554, filed on Jul. 14, 2005.

FIELD OF INVENTION

This invention relates, generally, to indicator systems for vehicles; more particularly, to vehicle hazard warning flashers that are activated if the vehicle undergoes heavy braking or rapid deceleration.

BACKGROUND

The art of motor vehicle design has developed numerous systems for signaling braking, turning, or other such actions by the vehicle's driver to the neighboring vehicles. The conventional brake lights used on vehicles are commonly activated upon pressing of the brake pedals. One of the shortcomings of conventional brake lights, however, is that they are activated to the exact same degree regardless of the degree of pressure applied to the brakes or stopping. That is, to neighboring drivers, the brake lights appear the same whether the driver slams on the brakes with all his might or whether the driver gently finesses the brake pedals. Thus, the neighboring drivers are not able to discern the degree of stopping from looking at the brake lights alone.

Several systems have been developed in order to improve upon these conventional brake light systems and better inform neighboring vehicles of the driver's impending actions. U.S. Pat. No. 5,139,115 to Browne, et al., for example, discloses a vehicle braking indicator system that provides a continuous lighting of the brake lights, under normal stopping conditions. When the anti-lock brakes (ABS) of the vehicle are activated, however, the system activates intermittent flashing of the brake lights, thus, indicating a more severe and sudden braking should be anticipated by neighboring cars. This system, however, has several shortcomings. First, the safety system does not become activated until the vehicle is already in an unsafe condition because it is not activated until the anti-lock braking system has been activated. Second, the system relies upon the vehicle's existing flashing mechanism in order to intermittently flash the vehicle's lights. Thus, the system does not add an additional flasher mechanism to the vehicle. Also, the system will not be activated if there is deceleration by other means, such as a collision with a stationary object. Moreover, because there is a large variation on the operation and activation of ABS systems, the system will not operate uniformly for vehicles produced by varying manufacturers. Finally, the system is comprised of a relatively complex system, which may be undesirable because of the additional costs and unreliability commonly associated with complex electronic systems.

Another such system is disclosed by U.S. Pat. No. 6,023,221 to Michelotti, which discloses a system that automatically activates hazard warning lights under circumstances of hard braking or sudden stoppage. The system uses an accelerometer, which measures the longitudinal acceleration of the vehicle in order to determine hard braking conditions. When hard braking conditions are detected by the system, it operates to activate the vehicle's hazard lights. This system, however, operates by indicating hazards to other vehicles in the context of an emergency situation, rather than as an early warning of impending danger. Furthermore, by using an accelerometer, the system is subject to inaccuracies because accelerometers are commonly subject to vibration, lateral motion, vehicle tilt, and other such disturbances to the system.

Thus, there remains a long felt need in the art for an indicator system that provides the earliest possible warning to neighboring vehicles of a potential hazard by a driver, such as an emergency stop, without relying upon ABS-systems or accelerometers in order to operate.

SUMMARY OF THE INVENTION

One embodiment of the invention is directed towards overcoming the above shortcomings by disclosing a system that provides the earliest possible warning to neighboring vehicles of the vehicle's rapid deceleration.

One embodiment of the invention discloses a means for detecting a vehicle's rapid deceleration by detecting vehicle speed through the vehicle's speed sensor (VSS), which is commonly included in the vehicle's Engine Control Unit (ECU). The VSS is present on all vehicles from 1996 and newer, as well as many older vehicles. The VSS is included as part of the International Standards Organization (ISO) standard system included in On Board Diagnostics (OBD), particularly the specification for OBD-II, which is the standard protocol used by modern ECU's.

Use of the vehicle speed sensor to calculate deceleration provides a highly reliable system that vastly improves upon prior art systems, such as those disclosed by the '115 and '221 patents. OBD-II systems utilize a Controller Area Network Bus (CAN-bus) in order to transmit signals from the OBD-II Electronic Controller Unit (ECU). The CAN-bus provides a robust communications bus for use in highly electromagnetically noisy environments and thus, is well suited to vehicle applications because of the stability of the system under relatively harsh conditions. Thus, the invention receives signals from the speed sensor, via the CAN-bus, which is a highly reliable means of communicating speed information to the system.

One embodiment of the invention operates by continuously monitoring the VSS and calculating the rate of change of the vehicle's speed in real time. Once a pre-determined deceleration threshold is exceeded, the invention triggers an on-board hazard flasher system for a preset period of time. Once the preset period of time has expired, the invention will reset itself and be prepared to again detect a rapid deceleration.

Thus, the disclosed system offers several improvements upon the prior art systems. Unlike the '115 patent, the system does not rely upon, or interfere with, the vehicle braking system in order to operate. The system further improves upon the '221 patent by not requiring the expensive and relatively unreliable addition of an accelerometer to the vehicle. Meanwhile, because the system operates by interfacing with existing ECU's OBD-II system, which are already included with most new cars, the system may be produced in a highly cost effective manner. The system, therefore, provides several improvements over prior art systems.

DETAILED DESCRIPTION OF THE DRAWINGS

In the following detailed description of various embodiments of the invention, numerous specific details are set forth in order to provide a thorough understanding of various aspects of one or more embodiments of the invention. However, one or more embodiments of the invention may be practiced without these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive. Also, the reference or non-reference to a particular embodiment of the invention shall not be interpreted to limit the scope the invention.

In the following description, certain terminology is used to describe certain features of one or more embodiments of the invention. For instance, "vehicle" refers to any non-living means of transportation, including: cars, trucks, motorcycles, trains, auto-rickshaws, vans, coaches, motorhomes, recreational vehicles, busses, and further such transportation means; "ECU" refers to any of the various types of engine control units or engine management systems that use microprocessors in order to control engine functions in vehicles; "OBD" refers to any of various on-board diagnostics or on-board devices that use microprocessors in order to provide self-diagnostic and reporting functions for the vehicle, including but not limited to OBD-II and other systems used with ECU's; "CAN-bus" refers to controller area network or other communications bus used by ECU's in order to communicate information to or from the ECU or other vehicle microprocessor-based vehicle management system.

Figure 1:
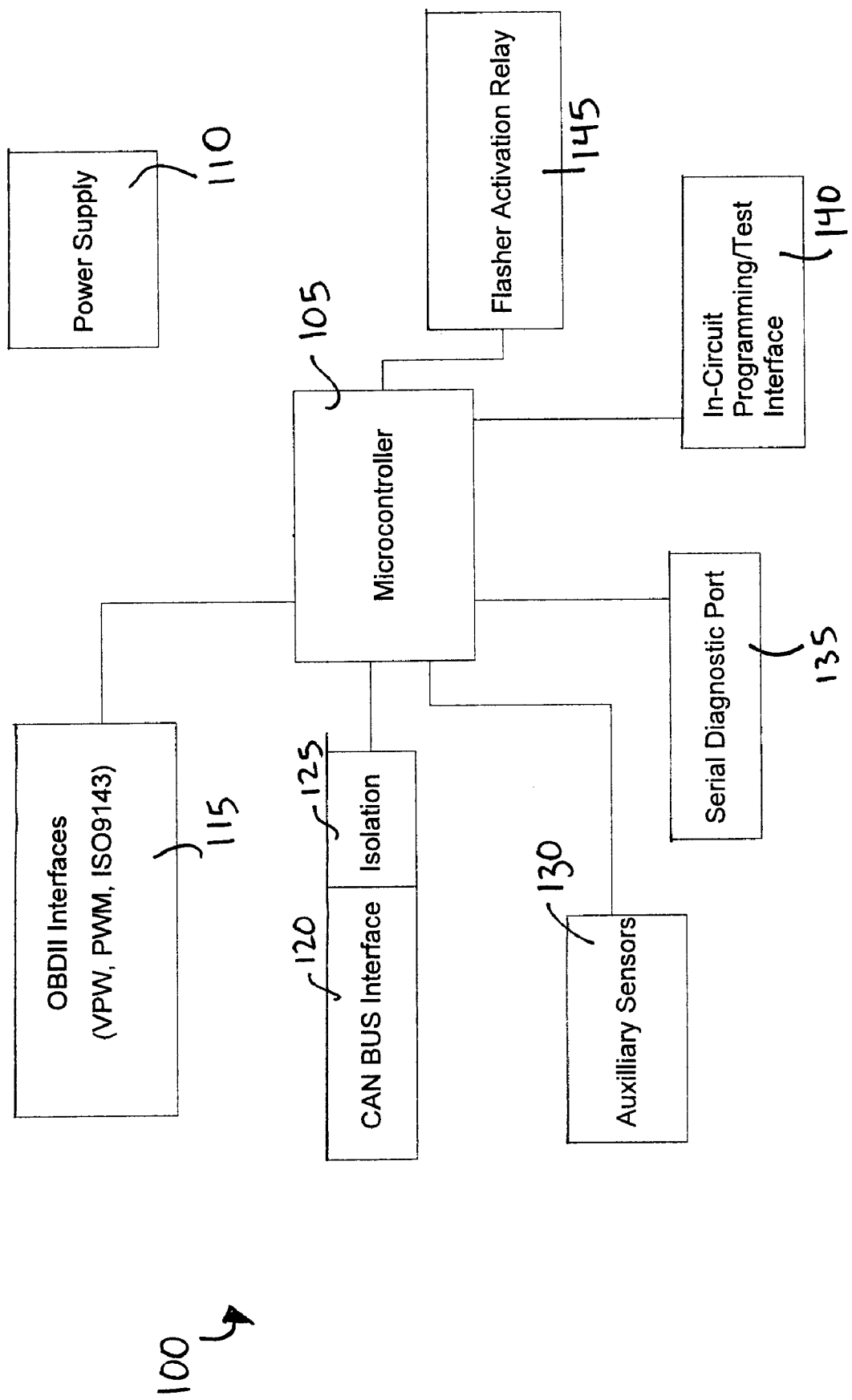
FIG. 1 is a schematic diagram illustrating the parts of the system in one embodiment of the invention.

FIG. 1 is a schematic diagram illustrating the parts of the system in one embodiment of the invention. A vehicle flasher system for indicating emergency braking 100 is displayed along with its constituent parts, including the micro-controller 105, the power supply 110, the OBD-II interfaces 115, the CAN-bus interface 120, the isolation unit 125 for the CAN-bus interface 120, the auxiliary sensors 130, the serial diagnostic port 135, the in-circuit programming/test interface 140, and the flasher activation relay 145.

Figure 2:
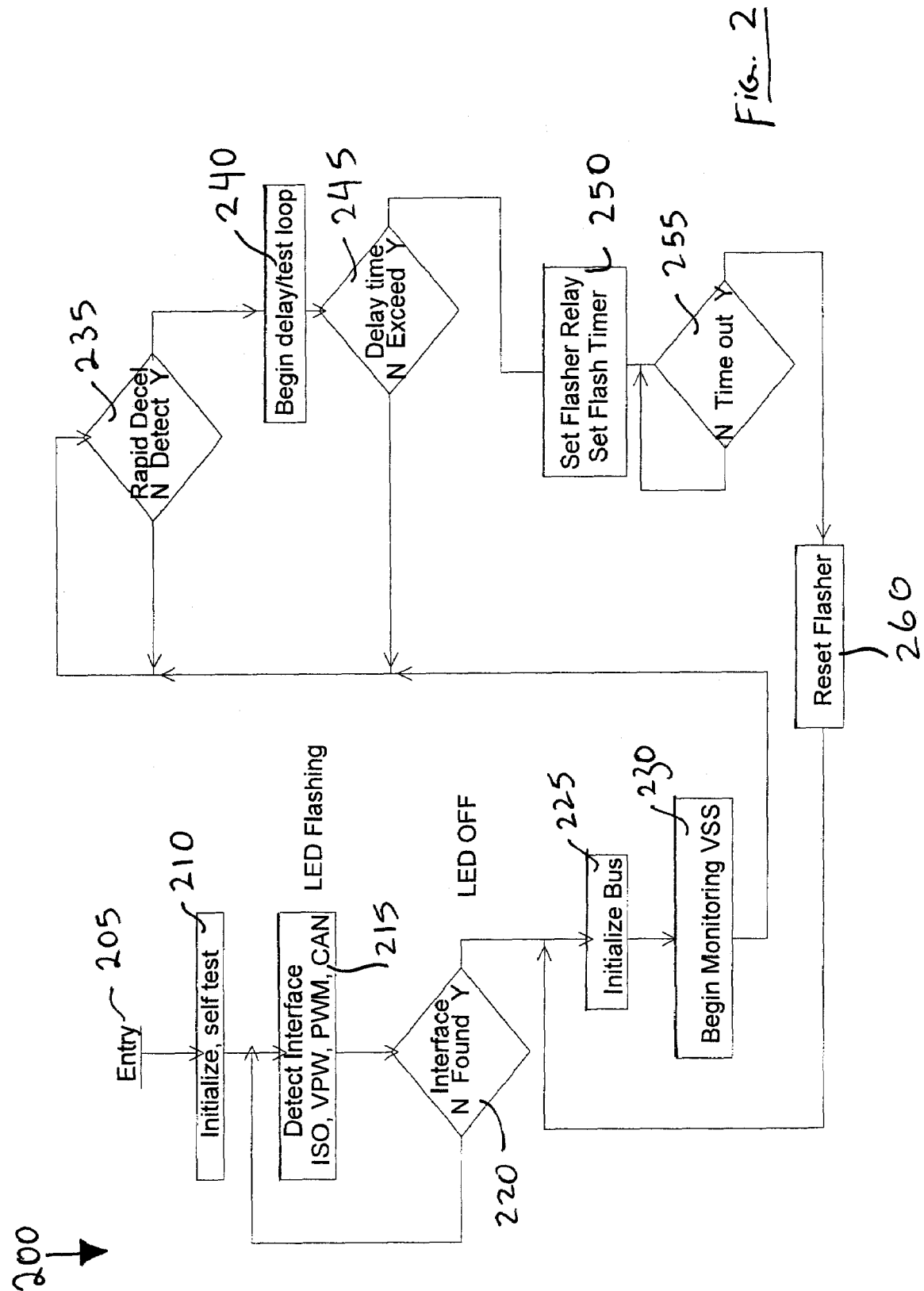
FIG. 2 is a flow chart that illustrates the operation of the system, in one embodiment of the invention.

FIG. 2 is a flow chart 200 that illustrates the operation of the system, in one embodiment of the invention. Upon entry 205 to the system, the system first initializes and performs a self-test 210. The system then proceeds to detect the presence of an interface with the ECU, such as a CAN-bus interface 215. Once the interface is detected 220, the system initializes the bus 225 and begins monitoring the Vehicle Speed Sensor (VSS) 230. If a rapid deceleration is detected 235, the system begins a delay/test loop 240, to verify the rapid deceleration. If the delay time is exceeded 245, then the system proceeds to activate the flasher relay and set the flash timer 255. Finally, after the flash time has exceeded its preset time limit 255, the system is reset 260. Then the bus is again initialized 225 and the process may be repeated.

What is claimed is:

1. A system for activating a vehicle's hazard warning lights, comprising:

a means for performing a self-test upon initialization;

a means for detecting the presence of an on-board microprocessor based system for performing engine management functions, a means for receiving signals related to the vehicle's speed from said on-board microprocessor based system responsive to a successful system initialization and detection of said on-board microprocessor-based system;

a means for calculating the vehicle's deceleration based upon said signals related to the vehicle's speed;

a means for determining if a preset deceleration threshold has been exceeded, and a means for activating the vehicle's hazard warning lights if said present deceleration threshold has been exceeded.

2. A system for activating a vehicle's hazard warning lights according to claim 1, wherein said on-board microprocessor based system for performing engine management functions comprises an engine control unit.

3. A system for activating a vehicle's hazard warning lights according to claim 1, wherein said on-board microprocessor based system includes an on-board diagnostic system.

4. A system for activating a vehicle's hazard warning lights according to claim 3, wherein said on-board diagnostic system comprises the OBD-II protocol.

5. A system for activating a vehicle's hazard warning lights according to claim 1, wherein said means for receiving signals related to the vehicle's speed comprises a controller area network serial bus.

6. A system for activating a vehicle's hazard warning lights according to claim 1, wherein said signals related to the vehicle's speed comprise signals from the vehicle speed sensor.

7. A system for activating a vehicle's hazard warning lights according to claim 1, wherein said hazard warning lights comprise one or more lights that are reserved for the exclusive use of the system.

8. A system for activating a vehicle's hazard warning lights according to claim 1, wherein said hazard warning lights comprise the hazard warning light system used by other systems within the vehicle.

9. A system for activating a vehicle's hazard warning lights according to claim 1, wherein said means for activating the vehicle's hazard warning lights maintains the operation of said hazard warning lights for a preset duration of time.

10. A system for activating a vehicle's hazard warning lights according to claim 1 further comprising a means for resetting the system following the activation of the vehicle's hazard warning lights by the system.

11. A system for activating a vehicle's hazard warning lights according to claim 9 further comprising a means for resetting the system following the expiration of said present duration of time.

12. A system for activating a vehicle's hazard warning lights, comprising:

a means for performing a self-test upon system initialization;

a means for detecting the presence of an engine control unit, said engine control unit featuring a controller area network serial bus and operating using the OBD-II protocol, a means for receiving vehicle speed sensor signals from said engine control unit through said controller network serial bus responsive to a successful system initialization and detection of said engine control unit;

a means for calculating the vehicle's deceleration based upon said vehicle speed sensor signals;

a means for determining if a preset deceleration threshold has been exceeded, and a means for activating the vehicle's hazard warning lights for a preset duration of time if said preset deceleration threshold has been exceeded, and a means for resetting the system upon the expiration of said preset duration of time.

13. A method for activating a vehicle's hazard lights, comprising:

initializing a system;

performing a self test of said system;

detecting the presence of an interface with a source of vehicle speed data;

monitoring said vehicle speed data;

detecting a rapid deceleration;

verifying the rapid deceleration; and activating a vehicle's hazard lights for a predetermined amount of time responsive to said verification of said rapid deceleration.

* * * * *